(12) United States Patent
Kibben et al.

(10) Patent No.: US 11,245,153 B2
(45) Date of Patent: Feb. 8, 2022

(54) BATTERY HOUSING

(71) Applicants: ThyssenKrupp Steel Europe AG, Duisburg (DE); thyssenkrupp AG, Essen (DE)

(72) Inventors: Martin Kibben, Dinslaken (DE); Erik Hilfrich, Dusseldorf (DE); Matthias Schirmer, Dusseldorf (DE)

(73) Assignee: thyssenkrupp AG, Essen (DE)

( * ) Notice: Subject to any disclaimer, the term of this patent is extended or adjusted under 35 U.S.C. 154(b) by 235 days.

(21) Appl. No.: 16/613,678

(22) PCT Filed: May 18, 2017

(86) PCT No.: PCT/EP2017/061945
§ 371 (c)(1),
(2) Date: Nov. 14, 2019

(87) PCT Pub. No.: WO2018/210420
PCT Pub. Date: Nov. 22, 2018

(65) Prior Publication Data
US 2021/0078413 A1 Mar. 18, 2021

(51) Int. Cl.
*B60L 50/60* (2019.01)
*H01M 50/20* (2021.01)
(Continued)

(52) U.S. Cl.
CPC ............ *H01M 50/20* (2021.01); *B60L 50/60* (2019.02); *H01M 50/24* (2021.01); *B60L 50/64* (2019.02); *H01M 2220/20* (2013.01)

(58) Field of Classification Search
CPC .......... H01M 10/6568; H01M 10/6556; B60K 11/04; B60K 1/04
See application file for complete search history.

(56) References Cited

U.S. PATENT DOCUMENTS 5,455,128 A * 10/1995 Tanaka .............. H01M 10/0525
429/221
5,663,008 A 9/1997 Shimakawa et al.
(Continued)

FOREIGN PATENT DOCUMENTS

CN 1134041 A 10/1996
CN 103917681 A 7/2014
(Continued)

OTHER PUBLICATIONS

International Search Report for International Application No. PCT/EP2017/061945 dated Jan. 19, 2018 with English translation.
(Continued)

*Primary Examiner* — Jonathan Ng
*Assistant Examiner* — James J Triggs
(74) *Attorney, Agent, or Firm* — RMCK Law Group PLC

(57) ABSTRACT

The present invention relates to a battery housing for an electrically powered vehicle, in particular a motor vehicle, comprising a battery accommodation space made of a first flat steel product and a housing frame made of a second flat steel product, where the two flat steel products differ in terms of at least one of the properties yield strength ($R_{p0.2}$), tensile strength ($R_M$) or elongation ($A_{50}$).

17 Claims, 2 Drawing Sheets

(51) Int. Cl.
*H01M 50/24* (2021.01)
*B60L 50/64* (2019.01)

(56) References Cited

U.S. PATENT DOCUMENTS

| | | |
|---|---|---|
| 2015/0357606 A1* | 12/2015 | Nishimura .............. B60L 50/64 |
| | | 429/176 |
| 2016/0141566 A1 | 5/2016 | Hamada |
| 2018/0023171 A1 | 1/2018 | Oh et al. |
| 2019/0119774 A1 | 4/2019 | Thiessen et al. |
| 2019/0131602 A1 | 5/2019 | Hilfrich et al. |

FOREIGN PATENT DOCUMENTS

| | | |
|---|---|---|
| CN | 104919620 A | 9/2015 |
| CN | 105321866 A | 2/2016 |
| CN | 109219899 A | 1/2019 |
| EP | 0732759 A1 | 9/1996 |
| EP | 2945204 A1 | 11/2015 |
| EP | 3026730 A1 | 6/2016 |
| WO | 2016177420 A1 | 11/2016 |
| WO | 2017207125 A1 | 12/2017 |

OTHER PUBLICATIONS

Search Report of 1st Chinese Office Action for CN Application No. 2017800909444 dated Nov. 25, 2021.

\* cited by examiner

BATTERY HOUSING

CROSS-REFERENCE TO RELATED APPLICATIONS

This application is a 371 U.S. National Stage of International Application No. PCT/EP2017/061945, filed May 18, 2017. The disclosure of the above application is incorporated herein by reference in its entirety.

TECHNICAL FIELD

The present invention relates to a battery housing for an electrically powered vehicle, in particular for a motor vehicle, and also an electrically powered vehicle, in particular a motor vehicle, comprising the battery housing of the invention.

TECHNICAL BACKGROUND

The continuing electrification of the automobile and the desire for long ranges of such vehicles require the development of high-performance battery concepts which have to satisfy complex requirements in respect of weight, stability and installation space for accommodating the battery modules. Further aspects such as cooling, corrosion protection and assembly also have to be taken into account appropriately. Finally, it is desirable for the battery housing to be able to be produced simply and inexpensively.

The installation space for the components providing reinforcement in the event of a crash competes with the installation space for the battery modules and the installation space for cooling. Advantageous solutions provide a higher level of protection against a potential impact without taking up the installation space for the other components.

In a mode of construction based on deep-drawn parts, the challenge is in the forming of very high-strength materials. In the case of the deep-drawn parts known from the prior art, the corners are provided with large radii, which impairs utilization of the installation space. The forming situation improves in the case of hot-formable components, but radii in the corners are also necessary here.

A mode of construction based on profiles does provide better utilization of installation space, but the corresponding housings have many joins which are demanding in respect of impermeability, distortion on welding and tolerances.

SUMMARY OF THE INVENTION

It is therefore an object of the invention to provide a battery housing which is improved in comparison with the prior art.

This object is achieved by a battery housing having the features of claim 1.

Advantageous embodiments and variants of the invention are indicated in the dependent claims and the following description.

The invention provides for the battery housing for an electrically powered vehicle, in particular an electrically powered motor vehicle (E-car), to have a battery accommodation space made of a first flat steel product and a housing frame made of a second flat steel product, with the two flat steel products differing in terms of at least one of the property yield strength ($R_{p0.2}$), tensile strength ($R_M$) or elongation ($A_{50}$).

A combination of two different flat steel products surprisingly gives a battery housing which firstly has a high crash deformation resistance and secondly an improved installation space utilization.

Preference is given to both flat steel products consisting of a Q&P steel. A Q&P steel displays firstly a high strength (at least 1000 MPa, more preferably 1200 MPa) and secondly has good processing properties compared to similarly strong steels.

In a preferred variant, both flat steel products have a composition containing, in addition to iron and unavoidable impurities, (in % by weight) 0.1-0.35 of C, more preferably 0.15-0.35 of C; 0.5-1.8 Si, more preferably 0.8-1.8 of Si; 1.4-3.2 of Mn; up to 1.0 of Al, more preferably up to 0.04 of Al; up to 0.015 of P; up to 0.0025 of S; up to 0.0075 of N; and optionally from one to four elements selected from the group consisting of Mo, V, Ti and/or Nb, B and Cr in contents of 0.1-0.5 of Cr, more preferably 0.2-0.35 of Cr; 0.05-0.25 of Mo, more preferably 0.20-0.25 of Mo; 0.05-0.15 of V, more preferably 0.06-0.07 of V; 0.0005 to 0.005 of B; 0.005-0.135 of Ti and/or Nb. A microstructure in the steel comprising less than 30%, more preferably less than 5%, of ferrite, less than 10% of bainite, 5-70% of unannealed martensite, 5-30% of residual austenite and 25-80% of annealed martensite (in % by area) is set by a specific process. Furthermore, at least 99% of the iron carbides present in the annealed martensite have a size of less than 500 nm.

The first flat steel product is preferably selected so that it has a good formability of the material in addition to the high strength, so that the battery accommodation space has a combination of high crash deformation resistance and good formability.

The housing frame runs along the edge of the battery housing and preferably has a rectangular or pentagonal cross section. The battery housing can be joined to the body of the vehicle by means of the housing frame. For this purpose, the housing frame preferably has openings so that it can be screwed by means of screws to the body. As an alternative, the housing frame can also be joined by positive locking or substance-to-substance bonding to the body. Corresponding techniques are known to those skilled in the art.

The housing frame is preferably made of a high-strength variant of Q&P steel, so that the housing frame makes a significant contribution to preventing intrusions in the case of laterally acting crash loads.

In a preferred variant, the housing frame is made up of at least 4 profile elements. The profile elements can be joined at the corners by a miter joint or a butt joint.

The profile elements preferably have reinforcing elements arranged inside in order to prevent collapse of the housing frame in the event of a crash. The reinforcing elements are bulkhead plates, hat profiles or meander-shaped profiles which are arranged inside. The reinforcing elements are preferably made of the second flat steel product.

The first flat steel product preferably has a yield strength of at least 650 MPa, a tensile strength of at least 1250 MPa and/or an elongation of at least 18% and the second flat steel product preferably has a yield strength of at least 1000 MPa, a tensile strength of at least 1400 MPa and/or an elongation of at least 12%.

In a preferred variant, the battery accommodation space is configured in the form of a trough having a circumferential flange.

In a mode of construction based on preferably deep-drawn parts, the battery modules are located in an installation space-optimized manner in the trough, since relatively small corner radii can be realized as a result of the use of a Q&P variant having good formability. The trough can, in a preferred variant of the present invention, be closed by means of a matching lid. The lid is preferably likewise configured as deep-drawn part and has a circumferential flange at which the joining by screwing and/or adhesive bonding and also sealing to the trough is effected. The advantage of this mode of construction is that there are no welded seams running over the sealing flange and gaps leading outward in the trough are welded shut—the risk of leaks is greatly reduced thereby.

The trough is preferably made in one piece and has a lower radius Ru in the range 5-15 mm, preferably 5-12 mm, and/or an upper radius Ro in the range 4-12 mm, preferably 4-10 mm, and/or a drawing angle α in the range 2-6°, preferably 2-5°.

Thus, the trough is, in one illustrative embodiment, preferably made in one piece and has a lower radius Ru in the range 5-15 mm, preferably 5-12 mm. In another illustrative embodiment, the trough is preferably made in one piece and has an upper radius Ro in the range 4-12 mm, preferably 4-10 mm. In a further illustrative embodiment, the trough is preferably made in one piece and has a drawing angle α in the range 2-6°, preferably 2-5°. In a further illustrative embodiment, the trough is preferably made in one piece and has a lower radius Ru in the range 5-15 mm, preferably 5-12 mm, and an upper radius Ro in the range 4-12 mm, preferably 4-10 mm. In a further illustrative embodiment, the trough is preferably made in one piece and has a lower radius Ru in the range 5-15 mm, preferably 5-12 mm, and a drawing angle α in the range 2-6°, preferably 2-5°. In a further illustrative embodiment, the trough is preferably made in one piece and has an upper radius Ro in the range 4-12 mm, preferably 4-10 mm, and a drawing angle α in the range 2-6°, preferably 2-5°.

In a particularly preferred illustrative embodiment, the trough is made in one piece and has a lower radius Ru in the range 5-15 mm, preferably 5-12 mm, an upper radius Ro in the range 4-12 mm, preferably 4-10 mm, and a drawing angle α in the range 2-6°, preferably 2-5°.

For the purposes of the present invention, the radius Ru is the radius between a bottom plate and an outer wall, and the radius Ro is the radius between the outer wall and the flange of the battery accommodation space.

As an alternative, the trough is preferably made up of at least 4 frame profiles and a bottom plate. This mode of construction offers better installation space utilization since the corners have only a very small radius, if any.

The frame profiles are preferably welded to one another. The use of a Q&P steel makes same-type or virtually same-type joins possible. Same-type joins can usually be produced with particular process reliability, which reduces the testing requirement and after-working to ensure freedom from leaks.

In a further preferred variant, the battery housing additionally has an underride guard plate made of the first or second flat steel product.

The underride guard plate is arranged under the trough and preferably fastened detachably to the housing frame. The underride guard plate protects the battery cells from crash stresses impinging from below. There are here different stress profiles: blunt, large-area objects or small pointed objects which place different demands on the material. Since the underride guard plate is subjected to severe corrosive stress, it is preferably coated with a cathodic corrosion protection. The cathodic corrosion protection is selected in this case from the group consisting of hot galvanized, electrolytically galvanized, galvannealed, zinc-magnesium, zinc-aluminum.

In a further preferred variant, the battery accommodation space has longitudinal and/or transverse carriers which are arranged inside and/or outside and are made of the second flat steel product.

Longitudinal and/or transverse carriers can preferably be arranged within the trough and/or between the trough and the underride guard. These have a profile-like geometry with a preferably hat-shaped or rectangular cross section. At the connection to the trough, it can be advantageous to provide flanges. The longitudinal and transverse carriers make a decisive contribution to warding off crash stresses from the side and from below.

The lid has little function in the event of a crash and can also be made of a readily formable deep-drawing steel or a steel-polymer sandwich material. Aluminum, steel-polymer sandwich material or polymer are also conceivable.

In another aspect, the present invention provides an electrically powered vehicle, in particular motor vehicle, comprising a battery housing according to the invention.

BRIEF DESCRIPTION OF THE DRAWINGS

The invention will be illustrated below with the aid of drawings. The individual drawings show.

DESCRIPTION OF PREFERRED EMBODIMENTS

Figure 1:
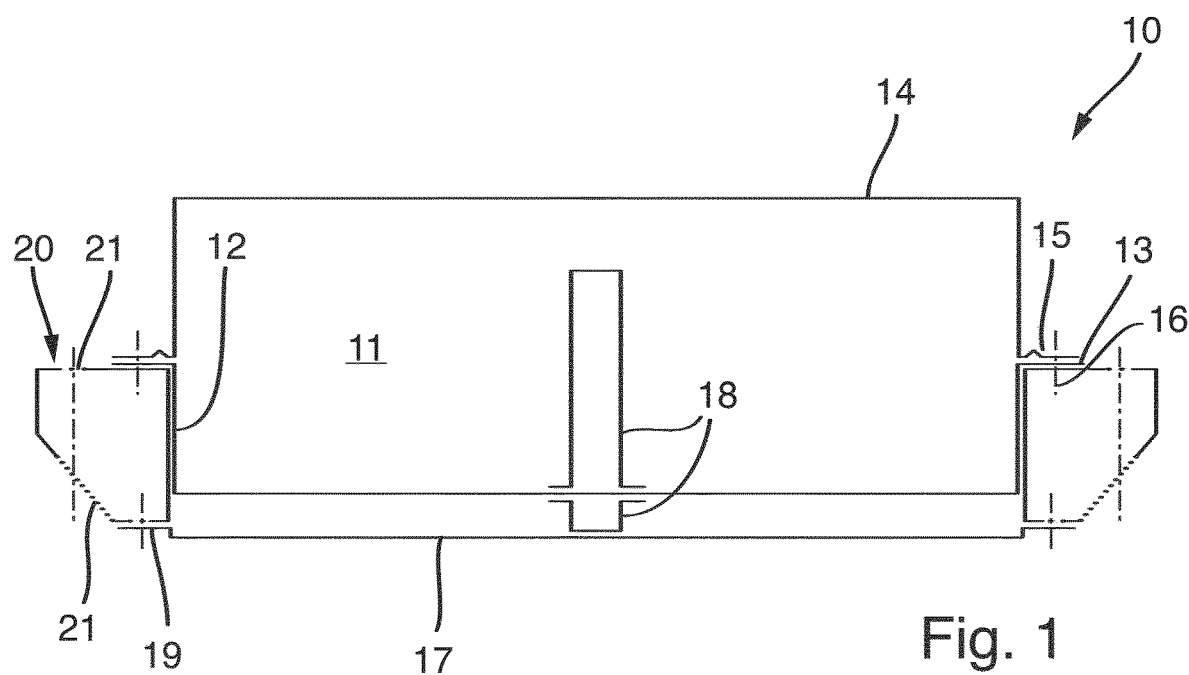
FIG. 1 a side view of a battery housing as per a first embodiment of the invention, FIG. 2 a plan view of the battery housing as per the first embodiment of the invention, FIG. 3 a section of a battery accommodation space as per the first embodiment of the invention, and FIG. 4 a sectional view of a battery housing as per a second embodiment of the invention.

FIG. 1 shows a sectional view of a battery housing 10 as per a first embodiment of the present invention. The battery housing 10, which is intended for an electrically powered vehicle (not shown), in particular an electrically powered motor vehicle (E-car), has a battery accommodation space 11 in the form of a trough 12 which is made in one piece. The trough 12 has a circumferential flange 13 via which the trough is joined to a housing frame 20. The housing frame 20 runs along the periphery of the battery housing 10 and has a pentagonal cross section. The battery housing 10 can be joined to the body of the vehicle (not shown) by means of the housing frame 20. For this purpose, the housing frame 20 has a plurality of openings 21 via which it can be screwed to the body. Furthermore, the battery housing has a lid 14 by means of which the trough 12 can be closed. The lid 12 likewise has a circumferential flange 15. The trough 12 can be joined by means of screws to the lid 14 at the housing frame via corresponding openings 16 in the respective flange 13, 15 and in the housing frame 20. Furthermore, the battery housing 10 has an underride guard plate 17 which is arranged under the trough 12 and is fastened detachably, for example by means of screws, to the housing frame 20 via a flange 19. The underride guard plate 17 protects the battery cells 30 from impact stresses impinging from below. Within and outside, i.e. between trough 12 and underride guard plate 17, the battery accommodation space 11 there are longitudinal and transverse carriers 18 which give the battery housing 10 additional stiffness. The longitudinal and transverse carriers 18 can have a profile-like geometry with a preferably hat-shaped or rectangular cross section. It can also be advantageous to provide flanges at the connection to the trough.

Figure 2:
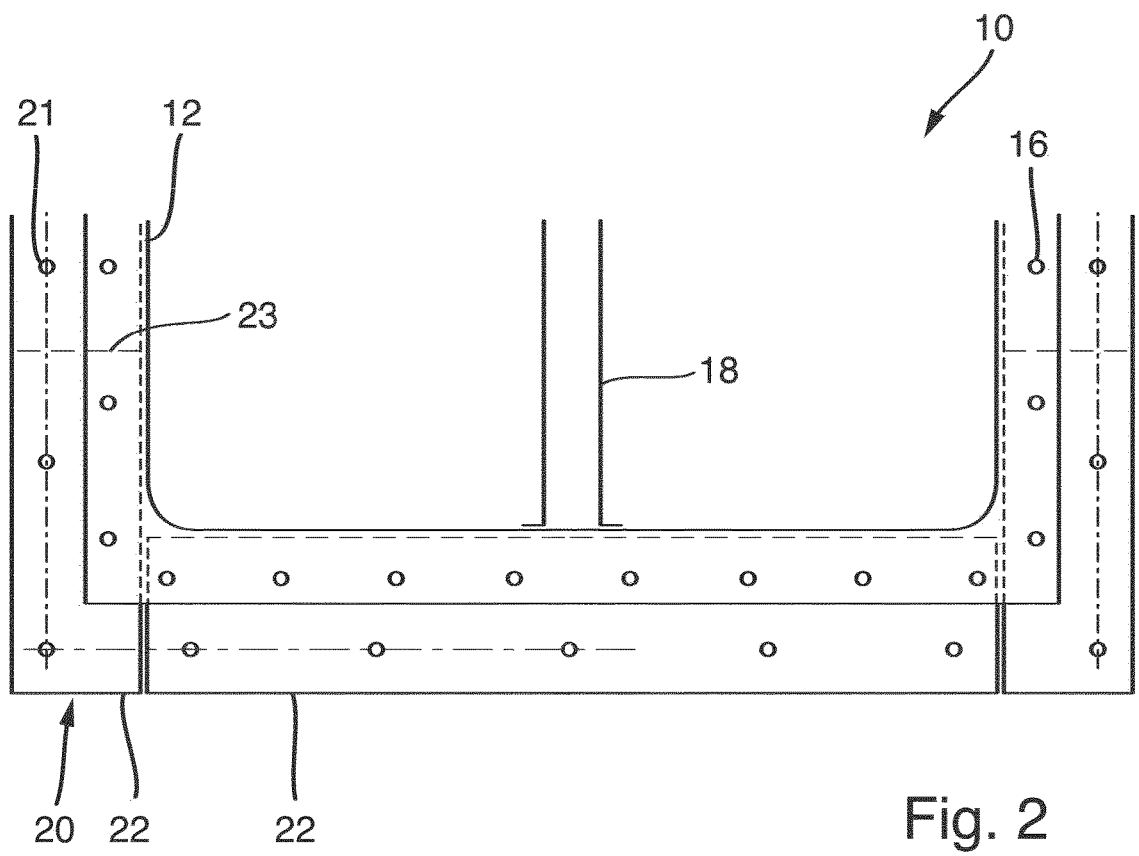

FIG. 2 shows a plan view of the battery housing 10 from which it is possible to see the structure of the housing frame 20 in more detail. The housing frame 20 consists of four individual profile elements 22 which are butt-welded to one another at the respective corners. Furthermore, the housing frame 20 has reinforcing elements 23 which are arranged inside and can be configured as bulkhead plates, hat profiles or meander-shaped profiles arranged inside.

Figure 3:
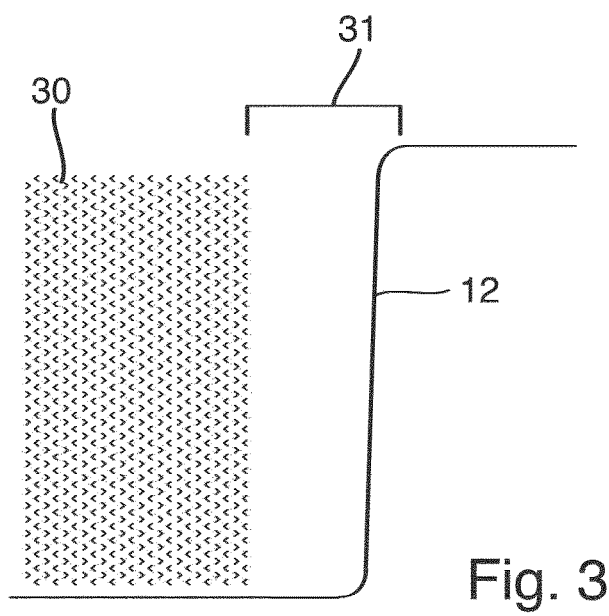

FIG. 3 shows a section of the battery accommodation space 11 with a deformation region 31 formed by the spacing between the battery cell 30 and the outer wall of the trough 12. The radius $R_u$, i.e. the radius between the bottom plate of the trough 12 and the outer wall, is preferably in the range 5-15 mm, and the radius $R_o$, i.e. the radius between the outer wall and the flange 15, is preferably in the range 4-12 mm. The outer wall of the trough 12 preferably has a drawing angle $\alpha$ in the range 2-6°.

For the purposes of the present invention, the radius Ru is the radius between a bottom plate and a side wall, and the radius $R_o$ is the radius between the side wall and the flange of the battery accommodation space.

Figure 4:
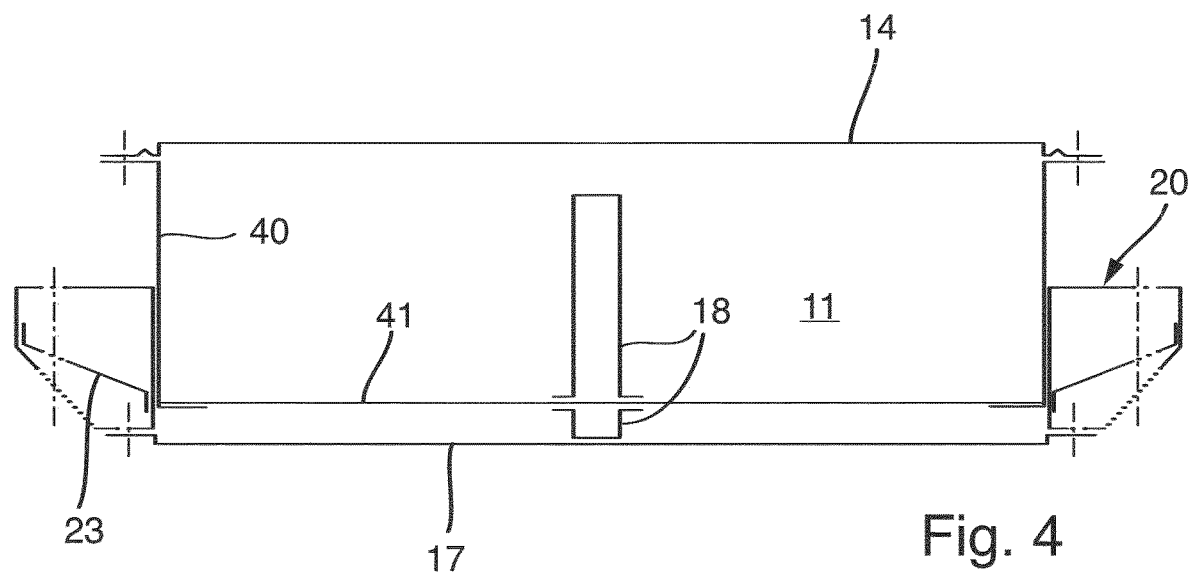

FIG. 4 shows a sectional view of a battery housing as per a second embodiment. In contrast to the embodiment of FIGS. 1 to 3, the battery accommodation space 11 is made up of four frame profiles 40 and a bottom plate 41. This mode of construction offers better utilization of the installation space since the corners have only a very small radius, if any.

The lid has little function in a crash and can also be made of a readily formable deep-drawing steel or a steel-polymer sandwich material. Aluminum, steel-polymer sandwich material or polymer are also conceivable.

LIST OF REFERENCE NUMERALS

10 Battery housing
11 Battery accommodation space
12 Trough
13 Flange
14 Lid
15 Flange
16 Openings
17 Underride guard plate
18 Longitudinal and transverse carriers
19 Flange
20 Housing frame
21 Openings
22 Profile element
23 Reinforcing elements
30 Battery cells
31 Deformation region
40 Frame profile
41 Bottom plate

The invention claimed is:

1. A battery housing for an electrically powered vehicle, in particular a motor vehicle, comprising:
a battery accommodation space made of a first flat steel product, and
a housing frame made of a second flat steel product, where the two flat steel products differ in terms of at least one of the properties yield strength ($R_{p0.2}$), tensile strength ($R_M$) or elongation ($A_{50}$);
wherein the first flat steel product has at least one of a yield strength of at least 650 MPa, a tensile strength of at least 1250 MPa and an elongation of at least 18% and the second flat steel product has at least one of a yield strength of at least 1000 MPa, a tensile strength of at least 1400 MPa and/or an elongation of at least 12%.

2. The battery housing as claimed in claim 1, wherein both flat steel products consist of a steel containing, in addition to iron and unavoidable impurities, (in % by weight)
C: from 0.1 to 0.35,
Si: from 0.5 to 1.8,
Mn: from 1.4 to 3.2,
Al: up to 1.0,
P: up to 0.015,
S: up to 0.0025,
N: up to 0.0075,
and has a microstructure comprising (in % by area) less than 30% of ferrite, less than 10% of bainite, 5-70% of unannealed martensite, 5-30% of residual austenite and 25-80% of annealed martensite, where at least 99% of the iron carbides present in the annealed martensite have a size of less than 500 nm.

3. The battery housing as claimed in claim 1, wherein the battery accommodation space is configured in the form of a trough having a circumferential flange.

4. The battery housing as claimed in claim 3, wherein the trough is made in one piece and has at least one of a radius $R_U$ in the range 5-15 mm and a radius $R_o$ in the range 4-12 mm and a drawing angle $\alpha$ in the range 6-8°.

5. The battery housing as claimed in claim 3, wherein the trough is made up of at least four frame profiles and a bottom plate.

6. The battery housing as claimed in claim 5 which further comprises an underride guard plate made of the first or second flat steel product.

7. The battery housing as claimed in claim 6, wherein the battery accommodation space has at least one of longitudinal and transverse carriers which are arranged at least one of inside and outside and are made of the second flat steel product.

8. The battery housing as claimed in claim 7, further comprising a lid.

9. The battery housing as claimed in claim 8, wherein the housing frame is made up of at least 4 profile elements.

10. The battery housing as claimed in claim 9, wherein the profile elements have reinforcing elements arranged inside.

11. An electrically powered vehicle, in particular motor vehicle, comprising a battery housing as claimed in claim 1.

12. The battery housing as claimed in claim 1, further comprising at least one element selected from the group consisting of "Mo, V, Ti and/or Nb, B and Cr" in the following contents:
Cr: from 0.1 to 0.5,
Mo: from 0.05 to 0.25,
V: from 0.05 to 0.15,
B: from 0.0005 to 0.005,
at least one of Ti and Nb: from 0.005 to 0.135.

13. A battery housing for an electrically powered vehicle, in particular a motor vehicle, comprising:
a battery accommodation space made of a first flat steel product, wherein the battery accommodation space is configured in the form of a trough having a circumferential flange, wherein the trough is made in one piece and has at least one of a radius $R_u$ in the range 5-15 mm and a radius $R_o$ in the range 4-12 mm and a drawing angle $\alpha$ in the range 6-8°, and a housing frame made of a second flat steel product, where the two flat steel products differ in terms of at least one of the properties yield strength ($R_{p0.2}$), tensile strength ($R_M$) or elongation ($A_{50}$).

14. A battery housing for an electrically powered vehicle, in particular a motor vehicle, comprising:
    a battery accommodation space made of a first flat steel product, wherein the battery accommodation space is configured in the form of a trough having a circumferential flange, wherein the trough is made up of at least four frame profiles and a bottom plate,
    a housing frame made of a second flat steel product, where the two flat steel products differ in terms of at least one of the properties yield strength ($R_{p0.2}$), tensile strength ($R_M$) or elongation ($A_{50}$); and
    an underride guard plate made of one of the first and the second flat steel product.

15. The battery housing as claimed in claim 14, wherein the battery accommodation space has at least one of longitudinal and/or transverse carriers which are arranged at least one of inside and outside and are made of the second flat steel product.

16. The battery housing as claimed in claim 15, wherein the housing frame is made up of at least 4 profile elements.

17. The battery housing as claimed in claim 16, wherein the profile elements have reinforcing elements arranged inside.

* * * * *